(12) United States Patent
Ishikawa (10) Patent No.: US 11,722,613 B1
(45) Date of Patent: Aug. 8, 2023

(54) IMAGE FORMING DEVICE (71) Applicant: Toshiba Tec Kabushiki Kaisha, Tokyo (JP)

(72) Inventor: Ryuta Ishikawa, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/700,467

(22) Filed: Mar. 21, 2022

(51) Int. Cl.
H04N 1/00 (2006.01)
G03G 15/00 (2006.01)

(52) U.S. Cl.
CPC ..... H04N 1/00652 (2013.01); G03G 15/6529 (2013.01); H04N 1/00602 (2013.01);
(Continued)

(58) Field of Classification Search
CPC .......... G03G 15/2039; G03G 15/5004; G03G 9/08755; G03G 9/08797; G03G 9/08795; G03G 15/1675; G03G 15/6529; G03G 9/0806; G03G 9/0819; G03G 15/80; G03G 9/08; G03G 9/08753; G03G 9/091; G03G 9/0912; G03G 9/0914; G03G 9/0922; G03G 15/1605; G03G 15/205; G03G 15/50; G03G 15/5062; G03G 21/203; G03G 2215/0129; G03G 9/0821; G03G 15/0266; G03G 15/065; G03G 15/234; G03G 15/5029; G03G 15/55; G03G 15/602; G03G 15/70; G03G 9/0804; G03G 9/083; G03G 9/087; G03G 9/08708; G03G 9/08782; G03G 15/1665; G03G 15/168; G03G 15/1695; G03G 15/2017; G03G 15/2064; G03G 15/5025; G03G 15/6502;
(Continued)

(56) References Cited

U.S. PATENT DOCUMENTS 5,863,036 A * 1/1999 Tanaka ................. B65H 3/5223
271/127
5,893,657 A * 4/1999 Matsuzawa ............ G03G 15/70
399/388

(Continued)

FOREIGN PATENT DOCUMENTS

JP 2003-095477 A 4/2003
JP 2003-252486 A 9/2003
(Continued)

Primary Examiner — Negussie Worku
(74) Attorney, Agent, or Firm — Foley & Lardner LLP (57) ABSTRACT An image forming device and a sheet conveyance method are provided. An image forming device includes a feeder, a first conveyor, a second conveyor, and a conveyance controller. The feeder aligns a sheet and feeds the sheet to a transfer system that transfers an image to the sheet. The first conveyor is arranged at a first position on an upstream side of the feeder in a sheet conveyance direction and conveys the sheet to the feeder. The second conveyor is arranged at a second position on an upstream side of the first conveyor in the sheet conveyance direction and conveys the sheet to the first conveyor. The conveyance controller performs high-speed control for causing a conveyance speed of the second conveyor to exceed a conveyance speed of the first conveyor when a specific sheet different from a normal sheet is fed by the feeder.

20 Claims, 9 Drawing Sheets (52) U.S. Cl.
CPC ..... *H04N 1/00713* (2013.01); *H04N 1/00724* (2013.01); *H04N 1/00604* (2013.01)

(58) Field of Classification Search
CPC .......... G03G 2215/00257; G03G 2215/00413; G03G 2215/00489; G03G 2215/00599; G03G 2215/00763; G03G 2215/00772; G03G 2215/00949; G03G 2215/0145; G03G 2215/2035; G03G 2215/2045; G03G 9/09; G03G 9/09725; G03G 15/2003; G03G 15/348; G03G 2215/00928; G03G 2215/2016; G03G 2215/2038; G03G 9/09716; G03G 15/00; G03G 15/0189; G03G 15/08; G03G 15/086; G03G 15/0865; G03G 15/0891; G03G 15/0893; G03G 15/161; G03G 15/20; G03G 15/2053; G03G 15/5008; G03G 15/5016; G03G 15/5058; G03G 15/5079; G03G 15/6508; G03G 15/6552; G03G 15/6555; G03G 15/6558; G03G 15/6564; G03G 15/6567; G03G 15/657; G03G 15/6576; G03G 15/6579; G03G 15/6582; G03G 15/6585; G03G 15/6591; G03G 21/00; G03G 21/0011; G03G 21/10; G03G 21/14; G03G 21/20; G03G 2215/00109; G03G 2215/00303; G03G 2215/00383; G03G 2215/00405; G03G 2215/00497; G03G 2215/0054; G03G 2215/00556; G03G 2215/00586; G03G 2215/00675; G03G 2215/00742; G03G 2215/00776; G03G 2215/00801; G03G 2215/00814; G03G 2215/0132; G03G 2215/0822; G03G 2221/1657; G03G 9/0827; G03G 9/09791; G03G 15/0225; G03G 15/043; G03G 15/2028; G03G 21/0035; G03G 21/18; G03G 2215/00738; G03G 2215/0607; G03G 2215/2032; G03G 2221/0005; G03G 2221/1621; G03G 9/0823; G03G 9/0825; G03G 9/08775; G03G 9/093; G03G 9/09371; G03G 9/09392; G03G 9/09733; G03G 9/09783; G03G 9/107; B65H 2220/01; B65H 2220/02; B65H 2511/21; B65H 2801/06; B65H 2511/15; B65H 2511/20; B65H 2513/51; B65H 2515/20; B65H 3/48; B65H 7/20; B65H 5/062; B65H 2220/03; B65H 2403/00; B65H 2404/632; B65H 2513/10; B65H 2515/32; B65H 2701/1311; B65H 2801/12; B65H 2801/27; B65H 29/125; B65H 5/021; B65H 5/06; B65H 2404/1431; B65H 2801/03; B65H 1/04; B65H 2220/11; B65H 2301/16; B65H 2301/33312; B65H 2301/4212; B65H 2301/4229; B65H 2301/512145; B65H 2301/5122; B65H 2301/51232; B65H 2301/51256; B65H 2402/10; B65H 2402/60; B65H 2403/481; B65H 2403/732; B65H 2403/92; B65H 2403/943; B65H 2404/1314; B65H 2404/166; B65H 2404/61; B65H 2404/63; B65H 2404/693; B65H 2405/11151; B65H 2407/21; B65H 2511/11; B65H 2511/13; B65H 2513/512; B65H 2513/52; B65H 2515/805; B65H 2551/20; B65H 2601/254; B65H 2601/324; B65H 2701/1313; B65H 2701/13212; B65H 29/14; B65H 29/58; B65H 29/70; B65H 3/06; B65H 3/0669; B65H 3/44; B65H 31/02; B65H 31/22; B65H 45/04; B65H 45/14; B65H 45/147; B65H 45/20; B65H 7/06; B65H 85/00; B65H 1/08; B65H 1/14; B65H 2403/512; B65H 2404/1441; B65H 2404/1451; B65H 2404/265; B65H 2405/324; B65H 2515/34; B65H 3/0676; B65H 3/0684; B65H 3/5223; B65H 3/5261; B65H 5/068; B65H 5/36; B65H 7/02; H04N 1/00596; H04N 2201/0094; H04N 1/00904; H04N 1/00037; H04N 1/0032; H04N 1/0083; H04N 1/00888; H04N 1/00933; H04N 1/00994; H04N 1/04; H04N 1/32571; H04N 1/36; H04N 1/6033; H04N 2201/04772; H04N 2201/04774; H04N 1/00244; H04N 1/00575; H04N 1/0058; H04N 1/00586; H04N 1/00708; H04N 1/00893; H04N 1/12; H04N 2201/0091; H04N 2201/044; H04N 1/00005; H04N 1/00034; H04N 1/00045; H04N 1/0005; H04N 1/00063; H04N 1/00076; H04N 1/00082; H04N 1/00087; H04N 1/00092; H04N 1/00519; H04N 1/00559; H04N 1/00644; H04N 1/0066; H04N 1/00724; H04N 1/00726; H04N 1/00737; H04N 1/00899; H04N 1/00912; H04N 1/0461; H04N 1/32635; H04N 1/32683; H04N 2201/001; H04N 1/00411; H04N 1/00551; H04N 1/00588; H04N 1/00694; H04N 1/0071; H04N 1/00718; H04N 1/00721; H04N 1/00734; H04N 1/0075; H04N 1/00774; H04N 1/00822; H04N 1/00976; H04N 1/10; H04N 1/3878; H04N 1/40; H04N 1/4486; H04N 1/58; G06K 15/406; G06K 15/1805; G06K 15/4065; G06K 15/002; G06K 15/023; G06K 15/027; G06K 15/129; G06K 15/4075; G06K 15/00; G06K 15/14; G06K 15/16; G06K 2215/0017; H02P 6/16; H02P 6/30; H02P 27/08; H02P 5/51; H02P 5/747; H02P 6/18; H02P 6/28; G05B 19/042; G05B 2219/2646; G05B 6/02
USPC ........................................................ 358/498
See application file for complete search history.

(56) References Cited

U.S. PATENT DOCUMENTS

| | | | | |
|---|---|---|---|---|
| 7,017,903 | B2* | 3/2006 | Fujii | B65H 43/04 |
| | | | | 271/298 |
| 10,815,087 | B2* | 10/2020 | Tsuboi | B65H 7/06 |
| 11,126,127 | B2* | 9/2021 | Takayama | B65H 9/006 |
| 2006/0202408 | A1 | 9/2006 | Yasui et al. | |
| 2007/0132174 | A1* | 6/2007 | Yamane | G03G 15/6576 |
| | | | | 271/188 |
| 2008/0203655 | A1* | 8/2008 | Bruhn | B65H 7/02 |
| | | | | 271/265.01 |
| 2009/0230607 | A1* | 9/2009 | Masui | G03G 15/6508 |
| | | | | 271/8.1 |
| 2011/0076076 | A1* | 3/2011 | Ban | G03G 15/234 |
| | | | | 399/364 |
| 2013/0249164 | A1* | 9/2013 | Yokoyama | B41J 11/006 |
| | | | | 271/225 |

(56) References Cited

U.S. PATENT DOCUMENTS

| | | | |
|---|---|---|---|
| 2013/0266357 A1* | 10/2013 | Egawa | G03G 15/6552 |
| | | | 399/405 |
| 2014/0368848 A1* | 12/2014 | Takata | B65H 29/60 |
| | | | 358/1.12 |
| 2016/0211780 A1* | 7/2016 | Ito | H02P 29/60 |
| 2016/0226430 A1* | 8/2016 | Tachibana | G03G 15/5004 |
| 2017/0012567 A1* | 1/2017 | Oohara | H02P 29/64 |
| 2018/0099827 A1* | 4/2018 | Tsuboi | B65H 5/06 |
| 2020/0174415 A1* | 6/2020 | Takayama | B65H 9/006 |

FOREIGN PATENT DOCUMENTS

| | | |
|---|---|---|
| JP | 2013-249177 A | 12/2013 |
| JP | 2017-109837 A | 6/2017 |

* cited by examiner

IMAGE FORMING DEVICE

FIELD

Embodiments described herein relate generally to an image forming device.

BACKGROUND

Image forming devices such as a printer and a multi function peripheral are widely used in offices or the like. The image forming device includes a resist roller and a conveyance roller arranged on an upstream side, and controls these rollers to feed a sheet to a transfer unit at a predetermined timing. The image forming device 100 performs aligning before feeding the sheet to the transfer unit. The aligning is an operation of aligning the sheet by stopping or reversing the resist roller and abutting the sheet against the resist roller.

DETAILED DESCRIPTION

In image forming devices such as those described above, during aligning, depending on the sheet, when the sheet collides with the resist roller, the conveyance roller may not absorb an impact. Therefore, the sheet may slip on the conveyance roller, and an abnormal noise may be generated due to the slipping of the sheet.

In general, according to at least one embodiment, an image forming device includes a feed unit (e.g., a feeder), a first conveyance unit (e.g., a first conveyor), a second conveyance unit (e.g., a second conveyor), and a conveyance control unit (e.g., a conveyance controller). The feed unit aligns a sheet and feeds the sheet to a transfer unit (e.g., a transfer system or transferor) that transfers an image to the sheet. The first conveyance unit is arranged at a first position on an upstream side of the feed unit in a sheet conveyance direction and conveys the sheet to the feed unit. The second conveyance unit is arranged at a second position on an upstream side of the first conveyance unit in the sheet conveyance direction and conveys the sheet to the first conveyance unit. The conveyance control unit performs high-speed control for causing a conveyance speed of the second conveyance unit to exceed a conveyance speed of the first conveyance unit when a specific sheet which is a second type of sheet different from a first type of sheet is fed by the feed unit.

Hereinafter, an image forming device according to an embodiment will be described with reference to drawings.

Embodiments

Figure 1:
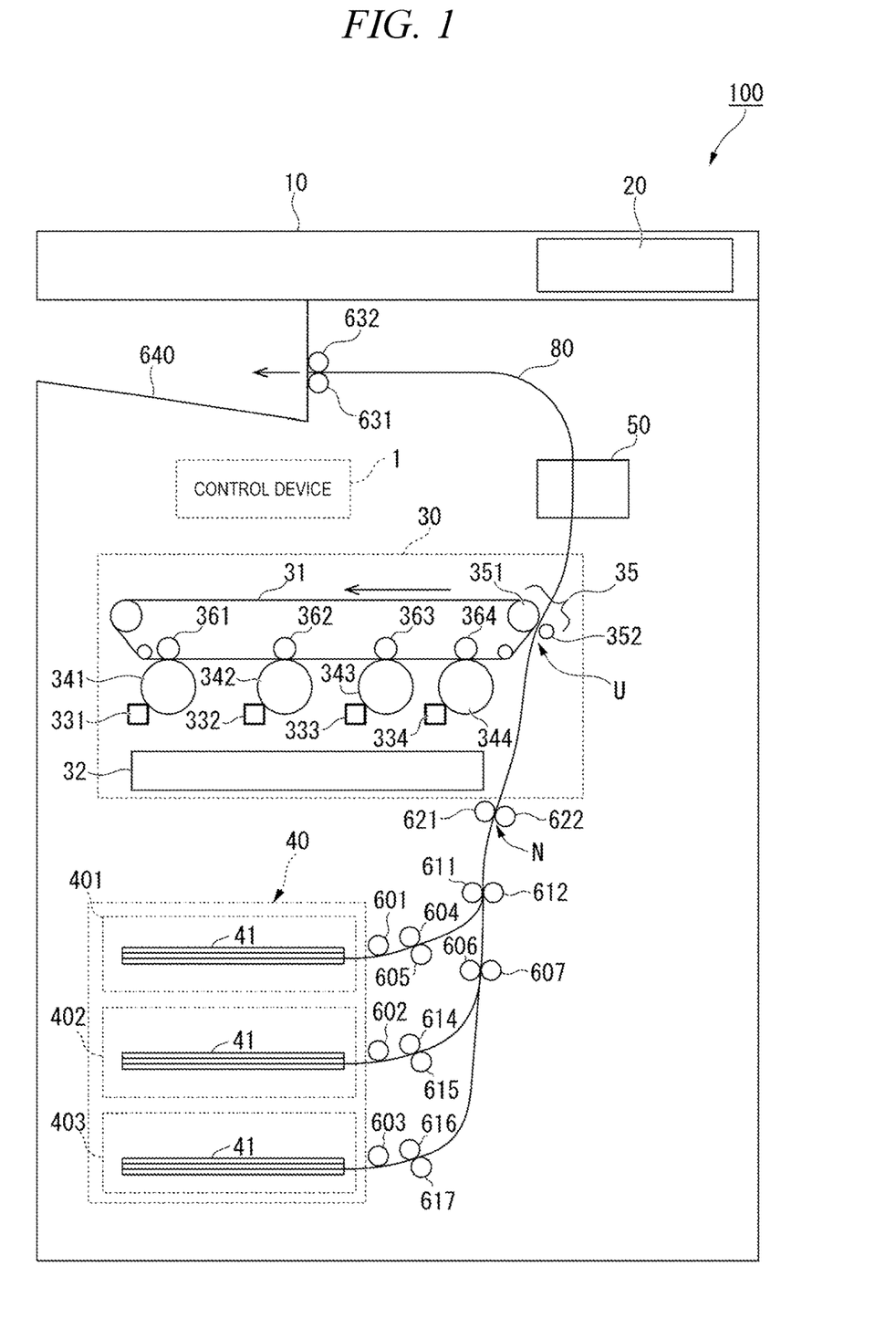
FIG. 1 is a diagram showing an overall configuration example of an image forming device 100 according to at least one embodiment.

FIG. 1 is a diagram showing an overall configuration example of an image forming device 100 according to the embodiment. The image forming device 100 according to the embodiment is a multi function peripheral (MFP). The image forming device 100 executes printing by an image forming process and an image fixing process. The image forming process is a process of forming an image on a sheet. The image fixing process is a process of fixing the image formed on the sheet. The sheet is, for example, a paper on which characters, images, and the like are formed. The sheet may be any object as long as the image forming device 100 can form an image on the object. For example, the sheet includes an ordinary copy paper (e.g., plain paper), a thick paper, a photographic sheet, a label sheet, a polyester film sheet, and the like.

The image forming device 100 includes a control device 1, an image reading unit 10, a control panel 20, an image forming unit 30, a sheet storage unit 40, a fixing unit 50, pickup rollers 601, 602, and 603, paper feed rollers 604, 614, and 616, separation rollers 605, 615, and 617, second conveyance rollers 606, 607, first conveyance rollers 611, 612, resist rollers 621, 622, and paper ejection rollers 631, 632.

The control device 1 controls each unit of the image forming device 100.

The image reading unit 10 reads an image to be read on a document as brightness of light. For example, the image reading unit 10 reads an image printed on the document to be read set on a document reading table. The image reading unit 10 records read image information. The recorded image information may be transmitted to another information processing device via a network. The recorded image information may be image-formed on the sheet by the image forming unit 30.

The control panel 20 includes a display unit and an operation unit. The display unit is a display device such as a liquid crystal display and an organic electro luminescence (EL) display. The display unit displays various information on the image forming device 100 under the control of the control device 1. The operation unit is an interface which includes a plurality of buttons and the like. The operation unit receives various operations from a user. The operation unit receives, for example, an instruction for inputting a sheet type and an instruction for starting printing. The operation unit outputs a signal corresponding to the operation performed by the user to the control device 1. The display unit and the operation unit may be touch panels.

The image forming unit 30 executes the image forming process. Specifically, the image forming unit 30 forms, on the sheet, an image based on the image information generated by the image reading unit 10 or image information received via a communication path. For example, the image forming unit 30 forms a toner image on the sheet by using toner.

The image forming unit 30 will be specifically described. The image forming unit 30 includes a transfer belt 31, an exposure unit 32, a plurality of developers 331 to 334, a plurality of photoreceptor drums 341 to 344, a transfer unit 35 (e.g., a transfer system or transferor), and a plurality of primary transfer rollers 361 to 364.

The transfer belt 31 is an endless intermediate transfer member. The transfer belt 31 rotates in a direction indicated by an arrow in FIG. 1 (e.g., counter-clockwise rotation in FIG. 1) due to the rotation of the roller.

The exposure unit 32 is provided at a position where the exposure unit 32 faces the photoreceptor drums 341 to 344 between the developers 331 to 334 and a charging device (not shown). The exposure unit 32 irradiates a surface (e.g., photoreceptor layer) of each of the photoreceptor drums 341 to 344 with a laser beam based on the image information. A direction in which the laser beam scans the photoreceptor drums 341 to 344 is a main scanning direction, and a direction orthogonal to the main scanning direction is a sub-scanning direction. For example, in the present embodiment, the main scanning direction coincides with an axial direction of the photoreceptor drums 341 to 344, and the sub-scanning direction coincides with a rotation direction of the transfer belt 31.

By radiating the laser beam, electric charges on the surface (e.g., photoreceptor layer) of each of the photoreceptor drums 341 to 344 disappear. As a result, electrostatic patterns are formed on positions irradiated with the laser beam on the surfaces of the photoreceptor drums 341 to 344. That is, electrostatic latent images are formed on the surfaces of the photoreceptor drums 341 to 344 by radiating the laser beam by the exposure unit 32. The exposure unit 32 may use light emitting diode (LED) light instead of the laser beam. The exposure unit 32 is controlled to emit light based on the image information under the control of the control device 1.

The developers 331 to 334 supply the toner to the photoreceptor drums 341 to 344. For example, the developer 331 develops the electrostatic latent image on the surface of the photoreceptor drum 341 with yellow (Y) toner. The developer 332 develops the electrostatic latent image on the surface of the photoreceptor drum 342 with magenta (M) toner. The developer 333 develops the electrostatic latent image on the surface of the photoreceptor drum 343 with cyan (C) toner. The developer 334 develops the electrostatic latent image on the surface of the photoreceptor drum 344 with black (K) toner.

The developers 331 to 334 form toner images as visible images on the photoreceptor drums 341 to 344.

The primary transfer roller 361 is provided at a position where the primary transfer roller 361 faces the photoreceptor drum 341 with the transfer belt 31 interposed therebetween. The primary transfer roller 362 is provided at a position where the primary transfer roller 362 faces the photoreceptor drum 342 with the transfer belt 31 interposed therebetween. The primary transfer roller 363 is provided at a position where the primary transfer roller 363 faces the photoreceptor drum 343 with the transfer belt 31 interposed therebetween. The primary transfer roller 364 is provided at a position where the primary transfer roller 364 faces the photoreceptor drum 344 with the transfer belt 31 interposed therebetween. The toner images formed on the photoreceptor drums 341 to 344 are transferred (e.g., primarily transferred) onto the transfer belt 31 by the primary transfer rollers 361 to 364.

The transfer unit 35 includes a support roller 351 and a secondary transfer roller 352. The transfer unit 35 transfers the toner images on the transfer belt 31 to the sheet at a secondary transfer position U. The secondary transfer position U is a position where the support roller 351 and the secondary transfer roller 352 face each other with the transfer belt 31 interposed therebetween. The transfer unit 35 applies a transfer bias controlled by a transfer current to the transfer belt 31. The transfer unit 35 transfers the toner image on the transfer belt 31 to the sheet by the transfer bias. The transfer current is controlled by the control device 1.

Next, a conveyance unit 80 for conveying a sheet 41 in which the sheet storage unit 40 is paused will be described.

The sheet storage unit 40 includes a plurality of paper feed cassettes 401, 402, and 403. Although the paper feed cassettes 401, 402, and 403 have three stages (e.g., three cassettes) in FIG. 1, in other embodiments they may have four or more stages (e.g., four or more cassettes). The paper feed cassettes 401, 402, and 403 each accommodate the sheets 41 of a predetermined size and a predetermined type. The sheets 41 of the predetermined types are, for example, sheets having different thicknesses. Specifically, the plain paper, the thick paper, and the like are used for the sheets 41 of predetermined types. In addition to the plain paper and the thick paper, other types of sheets may be stored in the sheet storage unit 40.

The paper feed cassettes 401, 402, and 403 are provided with the pickup rollers 601, 602, and 603. The pickup rollers 601, 602, and 603 take out the sheets 41 one by one from the paper feed cassettes 401, 402, and 403, and convey the taken out sheet 41 to a downstream side in a sheet conveyance direction, respectively. In the present specification, an upstream side means a sheet storage unit 40 side, and the downstream side means an ejection unit 640 side.

The paper feed rollers 604, 614, and 616 and the separation rollers 605, 615, and 617 convey the sheet 41 fed from the paper feed cassettes 401, 402, and 403 to the downstream side. Specifically, the paper feed roller 604 and the separation roller 605 convey the sheet 41 fed from the paper feed cassette 401 to the first conveyance rollers 611, 612. The paper feed rollers 614, 616 and the separation rollers 615, 617 convey the sheet 41 fed from the paper feed cassettes 402, 403 to the second conveyance rollers 606, 607, respectively. Hereinafter, the paper feed roller 604 and the separation roller 605 are referred to as "paper feed and separation rollers 604, 605".

The second conveyance rollers 606, 607 convey the sheet 41 fed from the paper feed cassette 402 or the paper feed cassette 403 to the downstream side. Specifically, the second conveyance rollers 606, 607 convey the sheet 41 to the first conveyance rollers 611, 612.

The first conveyance rollers 611, 612 convey the sheet 41 conveyed from the paper feed and separation rollers 604, 605 or the second conveyance rollers 606, 607 to the downstream side. Specifically, the first conveyance rollers 611, 612 convey the sheet 41 to the resist rollers 621, 622.

The resist rollers 621, 622 convey the sheet 41 to the downstream side at a timing when the toner image is transferred onto a surface of the sheet 41 by the transfer unit 35. The resist rollers 621, 622 align a front end of the sheet 41 fed by the first conveyance rollers 611, 612 at a nip N, and then convey the sheet 41 to the downstream side. The image forming device 100 aligns the sheet 41. The aligning of the sheet 41 is a process of adjusting orientation of the sheet 41 by abutting the front end of the sheet against the resist rollers 621, 622. As described above, the resist rollers 621, 622 are used to align the sheet 41 by abutting the front end of the conveyed sheet 41 against the resist rollers 621, 622.

The fixing unit 50 performs the image fixing process of fixing the toner image transferred onto the surface of the sheet 41 by the transfer unit 35. Specifically, the fixing unit 50 fixes the image (for example, the toner image) formed on the sheet 41 onto the sheet 41 by heating and pressing the sheet 41. The fixing unit 50 feeds the sheet 41 on which the image is fixed to the paper ejection rollers 631, 632.

The paper ejection rollers 631, 632 eject the sheet 41 on which the image is fixed by the fixing unit 50 to the ejection unit 640.

Figure 2:
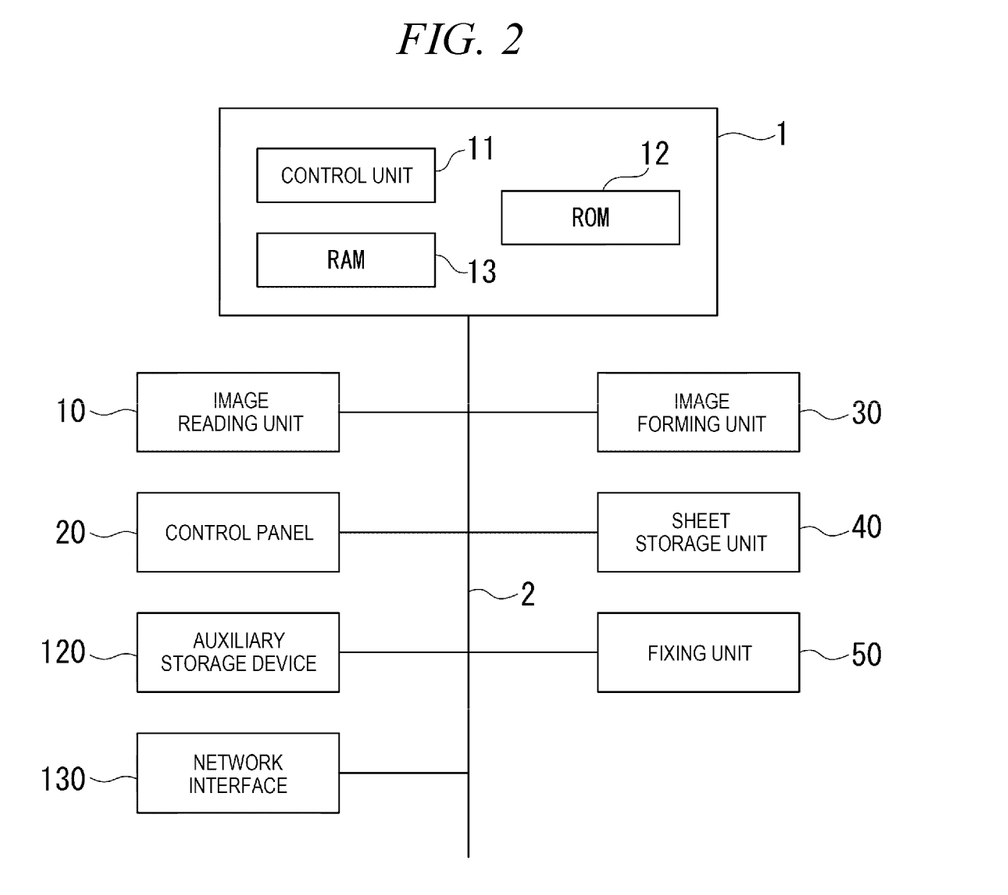
FIG. 2 is a block diagram showing a hardware configuration.

FIG. 2 is a block diagram showing a hardware configuration of the image forming device 100 according to the embodiment. FIG. 2 shows a part of the hardware configuration. The image forming device 100 includes an auxiliary storage device 120 and a network interface 130 in addition to the above-mentioned functional units. The functional units are connected to each other so as to be capable of data communication via a system bus 2.

In FIG. 2, the control device 1 includes a control unit 11, a read only memory (ROM) 12, and a random access memory (RAM) 13. The control unit 11 is, for example, a processor such as a central processing unit (CPU) or a graphics processing unit (GPU). The control unit 11 controls an operation of each functional unit of the image forming device 100. The control unit 11 executes various processes by loading a program stored in the ROM 12 into the RAM 13 and executing the program. The control unit 11 is not limited to performing the processes according to the present embodiment by executing the program, for example, the control unit 11 can perform the process according to the present embodiment by using a hardware (e.g., a circuit unit; including circuitry) such as a large scale integration (LSI), an application specific integrated circuit (ASIC), an field-programmable gate array (FPGA), and a graphics processing unit (GPU), or can perform the process according to the present embodiment by cooperation of a software and the hardware.

The ROM 12 stores the program for operating the control unit 11. The RAM 13 temporarily stores data used by each functional unit included in the image forming device 100. The RAM 13 may store digital data generated by the image reading unit 10. The RAM 13 may temporarily store a job and a job log.

The auxiliary storage device 120 is, for example, a hard disk or a solid state drive (SSD) and stores various data. The various data are, for example, the digital data, the job, the job log, and a control table.

The control table is, for example, a table in which control information on the aligning is registered. Specifically, the control table includes information for switching a conveyance speed and a conveyance direction of each roller according to a type of the sheet 41, or the like.

The network interface 130 transmits and receives data to and from another device. Here, the other device is, for example, the information processing device such as a personal computer. The network interface 130 operates as an input interface and receives data or an instruction transmitted from the other device. The instruction transmitted from the other device includes an instruction for executing printing, or the like. In addition, the network interface 130 operates as an output interface and transmits data to the other device.

Here, in the aligning, depending on the sheet 41, when the sheet 41 collides with the resist rollers 621, 622, the first conveyance rollers 611, 612 could not absorb an impact. Therefore, the sheet 41 may slip on the first conveyance rollers 611, 612, and an abnormal noise may be generated due to the slipping of the sheet 41. In particular, such slipping of the sheet 41 is remarkable in a case of a specific sheet 41 in which a basis weight of the sheet 41 is equal to or greater than a predetermined basis weight and/or a size of the sheet 41 is equal to or greater than a predetermined size.

In the present embodiment, the slipping of the sheet 41 on the first conveyance rollers 611, 612 is prevented during the aligning of the specific sheet 41. Hereinafter, the aligning according to the present embodiment will be described in detail with reference to FIGS. 3 and 4.

Figure 3:
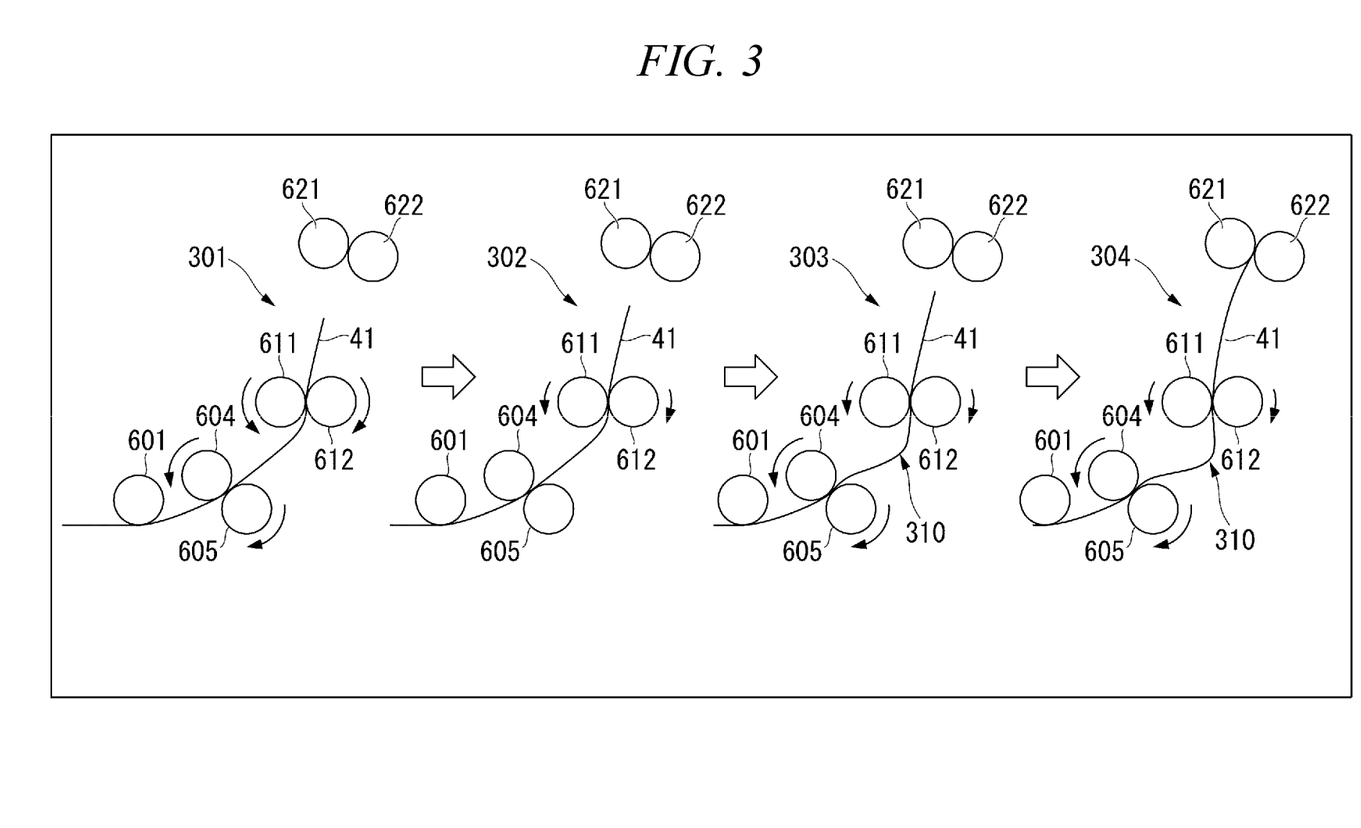
FIG. 3 is an explanatory diagram showing an example of an aligning operation of a specific sheet 41 fed from a paper feed cassette 401.

FIG. 3 is an explanatory diagram showing an example of an aligning operation of the specific sheet 41 fed from the paper feed cassette 401. In FIG. 3, a state 301 indicates a state of a pre-resist process. Specifically, the state 301 indicates a state in which the specific sheet 41 fed from the paper feed cassette 401 is arranged across the pickup roller 601, the paper feed and separation rollers 604, 605, and the first conveyance rollers 611, 612. In the state 301, the paper feed and separation rollers 604, 605 and the first conveyance rollers 611, 612 are rotating at a high speed. The high-speed rotation is, for example, about 1.8 times faster than a process speed (e.g., low-speed rotation). Therefore, the sheet 41 of the sheet storage unit 40 can be quickly conveyed to the resist rollers 621, 622.

A state 302 indicates a conveyance state when the sheet 41 is further conveyed to the downstream side after the pre-resist process in the state 301 is completed. In the state 302, the first conveyance rollers 611, 612 are rotating at a low speed (process speed). The paper feed and separation rollers 604, 605 are driven to rotate with movement of the sheet 41 conveyed by the first conveyance rollers 611, 612.

A state 303 indicates a conveyance state immediately before the sheet 41 reaches the resist rollers 621, 622 after the sheet 41 is further conveyed to the downstream side from the state 302. In the state 303, the first conveyance rollers 611, 612 are rotating at the low speed (e.g., process speed). The paper feed and separation rollers 604, 605 are rotating at the high speed. Therefore, a deflection 310 is generated in the sheet 41 between the paper feed and separation rollers 604, 605 and the first conveyance rollers 611, 612.

A state 304 indicates a conveyance state in which the sheet 41 is further conveyed to the downstream side from the state 303 and the sheet 41 collides with the resist rollers 621, 622. In the state 304, the first conveyance rollers 611, 612 are rotating at the low speed. The paper feed and separation rollers 604, 605 are rotating at the high speed. Therefore, the deflection 310 can be made larger than the deflection 310 at the state 303. That is, the image forming device 100 generates a large deflection 310 in the sheet 41 between the paper feed and separation rollers 604, 605 and the first conveyance rollers 611, 612.

Therefore, when the sheet 41 collides with the resist rollers 621, 622, the deflection 310 can strengthen stiffness of the sheet 41, so that the impact can be absorbed. Therefore, it is possible to prevent the sheet 41 from slipping on the first conveyance rollers 611, 612, and thus it is possible to prevent generation of the abnormal noise caused by the slipping of the sheet 41 fed from the paper feed cassette 401.

After the state 304, the sheet 41 is fed to the secondary transfer position U by the resist rollers 621, 622. When the sheet 41 is fed, the resist rollers 621, 622 and the first conveyance rollers 611, 612 are rotating at the low speed (e.g., process speed). On the other hand, the paper feed and separation rollers 604, 605 are driven to rotate with the movement of the sheet 41.

In each of the states 301 to 304, the pickup roller 601 may be controlled in the same manner as the paper feed and separation rollers 604, 605. That is, the pickup roller 601 may also be rotated at the high speed in the state 301, driven to rotate in the state 302, and rotated again at the high speed in the states 303, 304.

The aligning operation in the states 301 to 304 shown in FIG. 3 is not limited to being performed in the case of the sheet 41 fed from the paper feed cassette 401. For example, when a distance from the paper feed cassette 402 to the resist rollers 621, 622 is short, it is also possible to perform the aligning operation in which the sheet 41 fed from the paper feed cassette 402 transitions to the states 301 to 304. However, in this case, the paper feed and separation rollers 604, 605 may be provided between the paper feed cassette 402 and the first conveyance rollers 611, 612 without providing the second conveyance rollers 606, 607. In addition, similarly, the aligning operation shown in the states 301 to 304 can be performed for the paper feed cassette 403 according to a distance from the paper feed cassette 403 to the resist rollers 621, 622.

Figure 4:
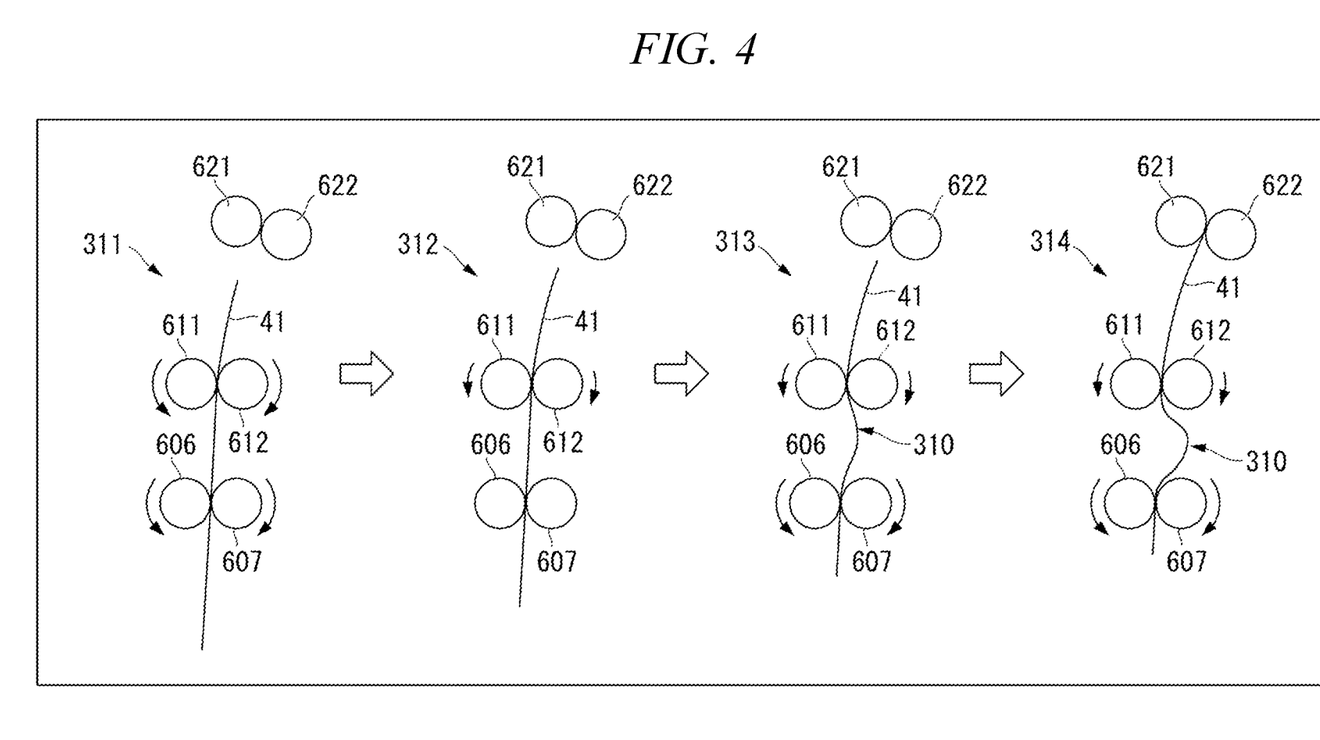
FIG. 4 is an explanatory diagram showing an example of an aligning operation of the specific sheet 41 fed from paper feed cassettes 402, 403.

FIG. 4 is an explanatory diagram showing an example of the aligning operation of the specific sheet 41 fed from the paper feed cassettes 402, 403. In FIG. 4, a state 311 indicates a state of a pre-process. Specifically, the state 311 indicates a state in which the specific sheet 41 fed from the paper feed cassette 402 or the paper feed cassette 403 is arranged across the second conveyance rollers 606, 607 and the first conveyance rollers 611, 612. In the state 311, the second conveyance rollers 606, 607 and the first conveyance rollers 611, 612 are rotating at the high speed. Therefore, the sheet 41 in the sheet storage unit 40 can be quickly conveyed to the resist rollers 621, 622.

A state 312 indicates a conveyance state when the sheet 41 is further conveyed to the downstream side after the pre-resist process (e.g., pre-process) in the state 311 is completed. In the state 312, the first conveyance rollers 611, 612 are rotating at the low speed (e.g., process speed). The second conveyance rollers 606, 607 are driven to rotate with the movement of the sheet 41 conveyed by the first conveyance rollers 611, 612.

A state 313 indicates a conveyance state immediately before the sheet 41 reaches the resist rollers 621, 622 after the sheet 41 is further conveyed to the downstream side from the state 312. In the state 313, the first conveyance rollers 611, 612 are rotating at the low speed (e.g., process speed). The second conveyance rollers 606, 607 are rotating at the high speed. Therefore, the deflection 310 is generated in the sheet 41 between the second conveyance rollers 606, 607 and the first conveyance rollers 611, 612.

A state 314 indicates a conveyance state in which the sheet 41 is further conveyed to the downstream side from the state 313 and the sheet 41 collides with the resist rollers 621, 622. In the state 314, the first conveyance rollers 611, 612 are rotating at the low speed. The second conveyance rollers 606, 607 are rotating at the high speed. Therefore, the deflection 310 can be made larger than the deflection 310 at the state 313. That is, the large deflection 310 is generated in the sheet 41 between the second conveyance rollers 606, 607 and the first conveyance rollers 611, 612.

Therefore, when the sheet 41 collides with the resist rollers 621, 622, the deflection 310 can strengthen the stiffness of the sheet 41, so that the impact can be absorbed. Therefore, it is possible to prevent the sheet 41 from slipping on the first conveyance rollers 611, 612, and thus it is possible to prevent the generation of the abnormal noise caused by the slipping of the sheet 41 fed from the paper feed cassette 402 or the paper feed cassette 403.

After the state 314, the sheet 41 is fed to the secondary transfer position U by the resist rollers 621, 622. When the sheet 41 is fed, the resist rollers 621, 622 and the first conveyance rollers 611, 612 are rotating at the low speed (e.g., process speed). The second conveyance rollers 606, 607 are driven to rotate with the movement of the sheet 41.

Next, a functional configuration of the image forming device 100 according to the present embodiment will be described.

Figure 5:
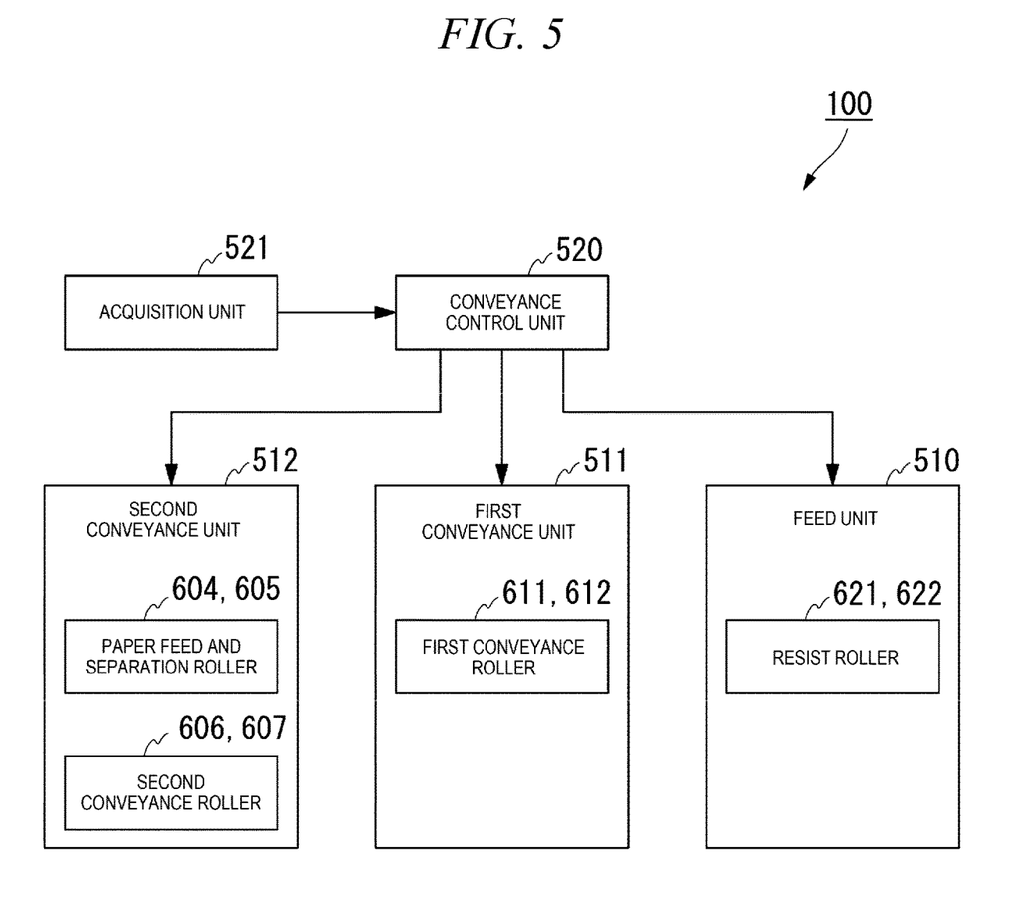
FIG. 5 is an explanatory diagram showing an example of a functional configuration.

FIG. 5 is an explanatory diagram showing an example of the functional configuration of the image forming device 100 according to the present embodiment.

As shown in FIG. 5, the image forming device 100 includes a feed unit 510 (e.g., a feeder), a first conveyance unit 511 (e.g., a first conveyor), a second conveyance unit 512 (e.g., a second conveyor), a conveyance control unit 520 (e.g., a conveyance controller), and an acquisition unit 521. The conveyance control unit 520 and the acquisition unit 521 are realized by the control unit 11. That is, the control unit 11 realizes functions of the conveyance control unit 520 and the acquisition unit 521 by executing a predetermined program stored in the ROM 12.

The feed unit 510 includes the resist rollers 621, 622 and a drive motor (not shown) that drives the resist rollers 621, 622. The feed unit 510 aligns the sheet 41 and feeds the sheet 41 to a transfer unit 35 (e.g., the secondary transfer position U shown in FIG. 1) that transfers an image to the sheet 41.

The first conveyance unit 511 includes the first conveyance rollers 611, 612 and a drive motor (not shown) that drives the first conveyance rollers 611, 612. The first conveyance unit 511 is arranged at a first position on the upstream side in the sheet conveyance direction with respect to the feed unit 510. The first position is a position where the first conveyance rollers 611, 612 are arranged, and specifically, is a position on the upstream side with respect to positions where the resist rollers 621, 622 are arranged and on the downstream side with respect to a position where the second conveyance unit 512 to be described later is arranged. The first conveyance unit 511 conveys the sheet 41 to the feed unit 510.

The second conveyance unit 512 includes the paper feed and separation rollers 604, 605, the second conveyance rollers 606, 607, and a drive motor (not shown) that drives these rollers. The drive motor included in the first conveyance unit 511 and the drive motor included in the second conveyance unit 512 may be one drive motor. The conveyance control unit 520 controls rotation of the first conveyance unit 511, the second conveyance unit 512, and each motor by switching a clutch connected to the drive motor. However, the drive motor included in the first conveyance unit 511 and the drive motor included in the second conveyance unit 512 may be separate drive motors.

The second conveyance unit 512 is arranged at a second position on the upstream side in the sheet conveyance direction with respect to the first conveyance unit 511. The second conveyance unit 512 conveys the sheet to the first conveyance unit. The second positions are positions where the paper feed and separation rollers 604, 605 and the second conveyance rollers 606, 607 are arranged, respectively. The second position is on the upstream side of the position where the first conveyance rollers 611, 612 are arranged, and is a position where a sheet rear end of the specific sheet 41 reaches when a sheet front end of the specific sheet 41 reaches the resist rollers 621, 622.

When the specific sheet 41 is fed by the feed unit 510, the conveyance control unit 520 performs a high-speed control for making the conveyance speed of the second conveyance unit 512 higher than the conveyance speed of the first conveyance unit 511. Specifically, the high-speed control is a control in which the first conveyance rollers 611, 612 are rotated at the low speed and the paper feed and separation rollers 604, 605 are rotated at the high speed, as shown in the states 303 and 304 of FIG. 3. Specifically, the high-speed control is a control in which the first conveyance rollers 611, 612 are rotated at the low speed and the second conveyance rollers 606, 607 are rotated at the high speed, as shown in the states 313 and 314 of FIG. 4.

Next, the specific sheet 41 according to the present embodiment will be described. The specific sheet 41 has a sheet size in which the rear end reaches the second position when the front end reaches the feed unit 510 (e.g., resist rollers 621, 622). The specific sheet 41 is, for example, a sheet 41 having a B5 size or larger. The sheet size of the specific sheet 41 is not limited to the B5 size or larger, and can be changed as appropriate.

In addition, the specific sheet 41 is a sheet 41 that is heavier than a normal sheet 41. Specifically, the specific sheet 41 is the thick paper, for example, a sheet 41 having a basis weight of 164 g/m² or more. In the present embodiment, the specific sheet 41 is a sheet 41 having the B5 size or larger and the basis weight of 164 g/m² or more. That is, in the present embodiment, the specific sheet 41 is a thick paper of the B5 size or larger. The basis weight of the sheet to be the specific sheet 41 is not limited to 164 g/m² or more, and can be changed as appropriate.

Next, acquisition of setting information will be described. The acquisition unit 521 acquires the setting information of the sheet 41 set by the user. The setting information includes information indicating the sheet size and information indicating a weight (e.g., basis weight) of the sheet 41. The acquisition unit 521 may acquire the setting information received from the user by the control panel 20, or may acquire the setting information received from the user by another device such as a personal computer by communication.

The conveyance control unit 520 performs the high-speed control when the sheet size acquired from the setting information acquired by the acquisition unit 521 is the sheet size of the specific sheet 41. In addition, the conveyance control unit 520 performs the high-speed control when the weight of the sheet 41 acquired from the setting information is the weight of the specific sheet 41.

Next, the pre-resist process will be described. Before the high-speed control, the conveyance control unit 520 performs a pre-process for increasing both the conveyance speed of the first conveyance unit 511 and the conveyance speed of the second conveyance unit 512. Specifically, as shown in the state 301 in FIG. 3, the conveyance control unit 520 rotates the paper feed and separation rollers 604, 605 and the first conveyance rollers 611, 612 at the high speed. In addition, as shown in the state 311 in FIG. 4, the conveyance control unit 520 rotates the second conveyance rollers 606, 607 and the first conveyance rollers 611, 612 at the high speed.

Next, a timing at which the high-speed control is performed will be described. The conveyance control unit 520 performs the high-speed control after the pre-resist process and before the specific sheet 41 reaches the feed unit 510. Specifically, as shown in the state 303 in FIG. 3 and the state 313 in FIG. 4, the conveyance control unit 520 performs the high-speed control before the sheet 41 reaches the resist rollers 621, 622.

Next, details of the control of the first conveyance unit 511 and the second conveyance unit 512 in the high-speed control will be described. The conveyance control unit 520 increases the conveyance speed of the second conveyance unit 512 after the second conveyance unit 512 is caused to follow the movement of the sheet 41 conveyed by the first conveyance unit 511 in the high-speed control. Specifically, as shown in the state 302 in FIG. 3, the conveyance control unit 520 rotates the paper feed and separation rollers 604, 605 at the high speed after the paper feed and separation rollers 604, 605 are driven to rotate with the movement of the sheet 41 in the high-speed control. In addition, as shown in the state 312 in FIG. 4, the conveyance control unit 520 rotates the second conveyance rollers 606, 607 at the high speed after the second conveyance rollers 606, 607 are driven to rotate with the movement of the sheet 41 in the high-speed control.

Next, a normal control different from the high-speed control will be described. The conveyance control unit 520 performs the normal control when the sheet 41 other than the specific sheet 41 is fed by the feed unit 510. The normal control is a control in which the second conveyance unit 512 is caused to follow the movement of the sheet 41 after the pre-resist process is completed, and then feeds the sheet 41 to the resist rollers 621, 622. The sheet 41 other than the specific sheet 41 is, for example, a sheet 41 of less than the B5 size or a sheet 41 having a basis weight of less than 164 g/m², and includes, for example, a postcard (e.g., small size thick paper) or ordinary A4 copy paper.

Next, an end timing of the high-speed control will be described. The conveyance control unit 520 ends the high-speed control when the feed unit 510 feeds the sheet. Specifically, the conveyance control unit 520 ends the high-speed rotation of the second conveyance unit 512 immediately after the sheet 41 is fed to the resist rollers 621, 622. A timing of feeding the sheet 41 to the resist rollers 621, 622 and a timing of ending the high-speed rotation of the second conveyance unit 512 may be the same timing.

Next, the timing of the high-speed control in the aligning operation will be described.

Figure 6:
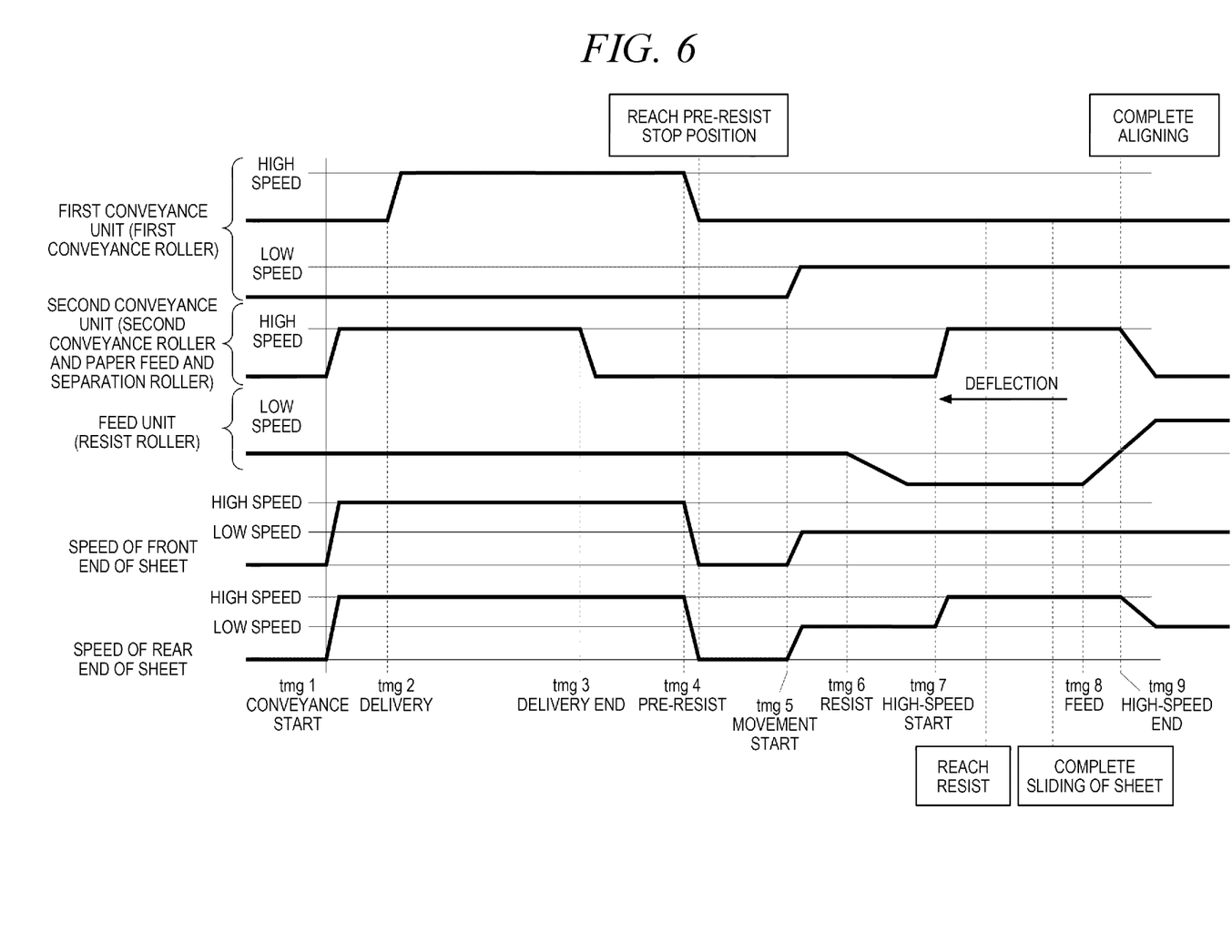
FIG. 6 is a timing chart showing switching of a rotation speed of each roller.

FIG. 6 is a timing chart showing switching of a rotation speed of each roller in the aligning operation. In FIG. 6, the control of the speed of each roller of the feed unit 510, the first conveyance unit 511, and the second conveyance unit 512 and the speed of the front end and the rear end of the sheet 41 will be described. In FIG. 6, "tmg" indicates the timing.

The respective timings shown in FIG. 6 will be described below.

Timing 1: when a conveyance start timing is reached, the conveyance control unit 520 controls the second conveyance unit 512 at the high speed. At this time, both the front end and the rear end of the sheet 41 move at the high speed.

Timing 2: when a delivery timing is reached, the conveyance control unit 520 controls the second conveyance unit 512 at the high speed.

Timing 3: when a delivery end timing is reached, the conveyance control unit 520 stops the second conveyance unit 512 and causes the second conveyance unit 512 to follow the movement of the sheet 41.

Timing 4: when a pre-resist timing is reached, the conveyance control unit 520 stops the first conveyance unit 511. Therefore, the sheet 41 reaches a pre-resist stop position and stops.

Timing 5: when a movement start timing is reached, the conveyance control unit 520 rotates the first conveyance unit 511 at the low speed (e.g., at the process speed). At this time, both the front end and the rear end of the sheet 41 move at the low speed. After the timing 5, the first conveyance unit 511 continues to the low-speed rotation until a next sheet 41 is conveyed.

Timing 6: when a resist timing is reached, the conveyance control unit 520 reversely rotates the feed unit 510.

Timing 7: when a high-speed start timing is reached, the conveyance control unit 520 rotates the second conveyance unit 512 at the high speed. At this time, while the front end of the sheet 41 moves at the low speed, the rear end of the sheet 41 moves at the high speed. Therefore, the deflection 310 is generated in the sheet 41. Then, the front end of the sheet 41 reaches the resist rollers 621, 622, and the sliding of the sheet 41 is completed.

Timing 8: when a feed timing of the sheet 41 is reached, the conveyance control unit 520 rotates the feed unit 510 in a forward rotational direction at the low speed (e.g., process speed).

Timing 9: when a high-speed end timing is reached, the conveyance control unit 520 stops the second conveyance unit 512 and causes the second conveyance unit 512 to follow the movement of the sheet 41. Therefore, the aligning is completed, and the sheet 41 is fed to the secondary transfer position U at the process speed.

Next, a sheet conveyance process performed by the image forming device 100 will be described with reference to FIG. 7.

Figure 7:
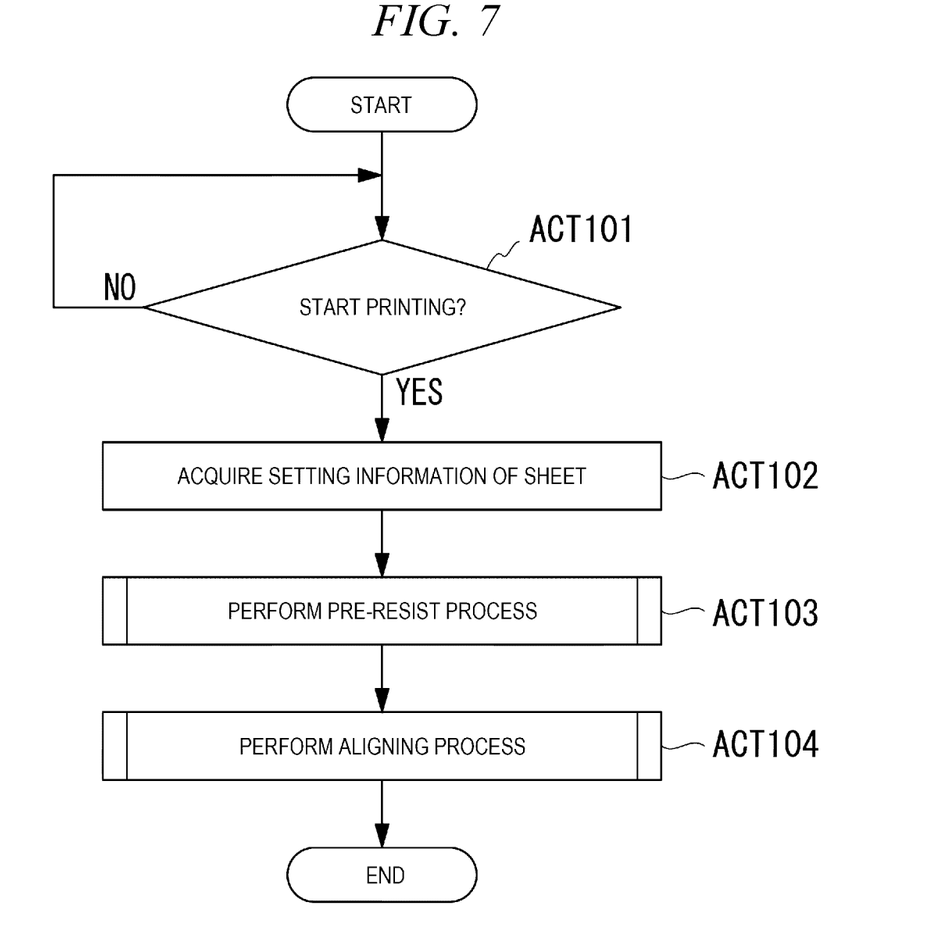
FIG. 7 is a flowchart showing an example of a sheet conveyance process.

FIG. 7 is a flowchart showing an example of the sheet conveyance process performed by the image forming device 100. In FIG. 7, the image forming device 100 waits until the printing is started (ACT 101: NO). When the printing is started (ACT 101: YES), the image forming device 100 acquires the setting information of the sheet 41 set by the user (ACT 102).

Next, the image forming device 100 performs the pre-resist process (see FIG. 8) (ACT 103). The image forming device 100 performs an aligning process (see FIG. 9) (ACT 104), and ends a series of processes.

Next, the pre-resist process performed by the image forming device 100 will be described with reference to FIG. 8.

Figure 8:
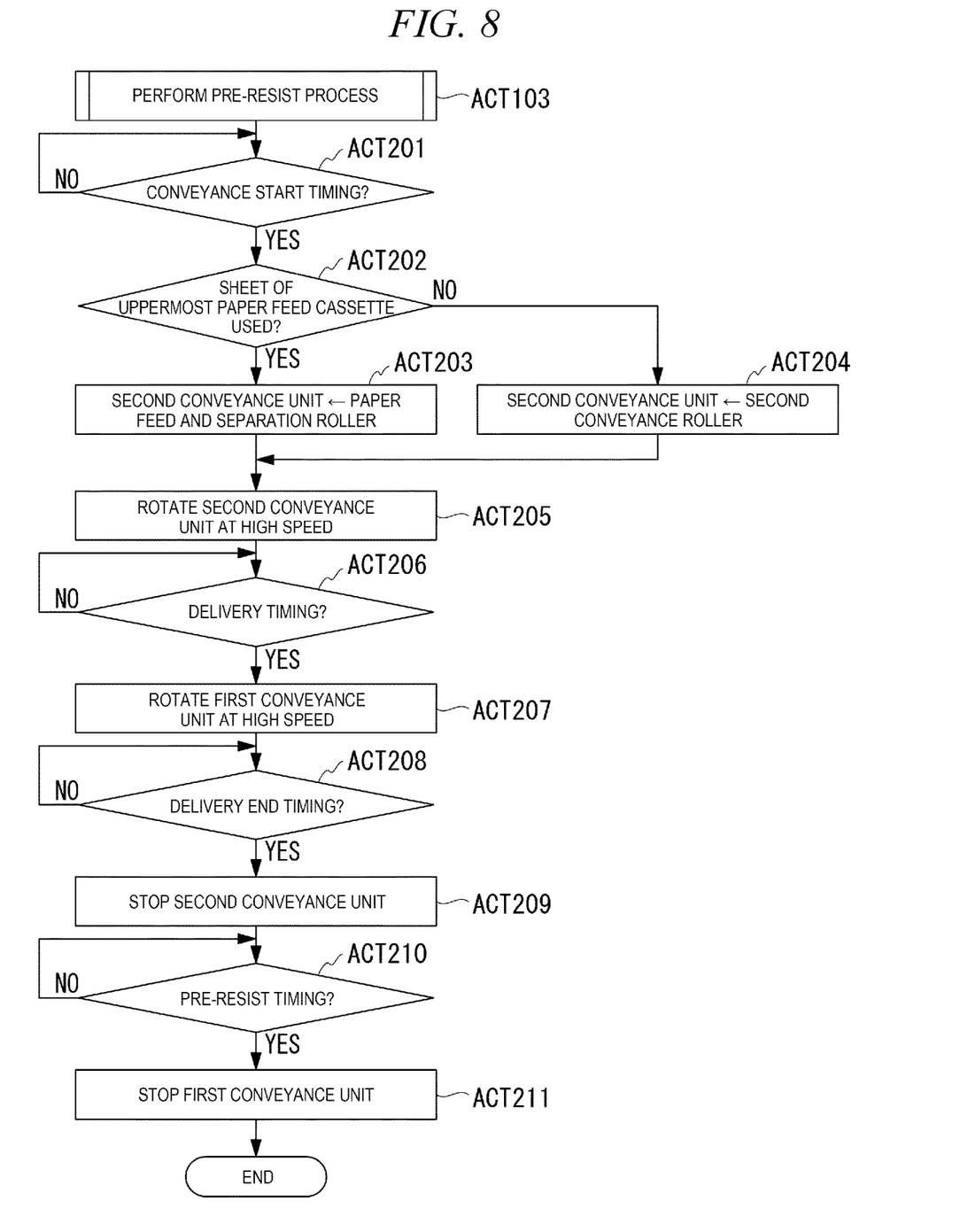
FIG. 8 is a flowchart showing an example of a pre-resist process.

FIG. 8 is a flowchart showing an example of the pre-resist process performed by the image forming device 100. In FIG. 8, the image forming device 100 waits until the conveyance start timing is reached (ACT 201: NO). When the conveyance start timing is reached (ACT 201: YES), the image forming device 100 determines whether the sheet 41 of an uppermost paper feed cassette 401 is used (ACT 202).

When the sheet 41 of the uppermost paper feed cassette 401 is used (ACT 202: YES), the image forming device 1 sets the paper feed and separation rollers 604, 605 as the second conveyance unit 512 (ACT 203). On the other hand, when the sheet 41 of the uppermost paper feed cassette 401 is not used (ACT 202: No), that is, when the sheets 41 of the paper feed cassettes 402, 403 are used, the image forming device 1 sets the second conveyance rollers 606, 607 as the second conveyance unit 512 (ACT 204).

Then, the image forming device 100 rotates the second conveyance unit 512 at the high speed (ACT 205). Then, the image forming device 100 waits until the delivery timing is reached (ACT 206: NO). When the delivery timing is reached (ACT 206: YES), the image forming device 100 rotates the first conveyance unit 511 (the first conveyance rollers 611, 612) at the high speed (ACT 207).

Next, the image forming device 100 waits until the delivery end timing is reached (ACT 208: NO). When the delivery end timing is reached (ACT 208: YES), the image forming device 100 stops the second conveyance unit 512 and causes the second conveyance unit 512 to follow the movement of the sheet 41 (ACT 209).

Then, the image forming device 100 waits until the pre-resist timing is reached (ACT 210: NO). When the pre-resist timing is reached (ACT 210: YES), the image forming device 100 stops the first conveyance unit 511 (ACT 211). Therefore, the sheet 41 reaches the pre-resist stop position. As described above, the pre-resist process can be the same regardless of the normal sheet 41 or the specific sheet 41.

Next, the aligning process performed by the image forming device 100 will be described with reference to FIG. 9.

Figure 9:
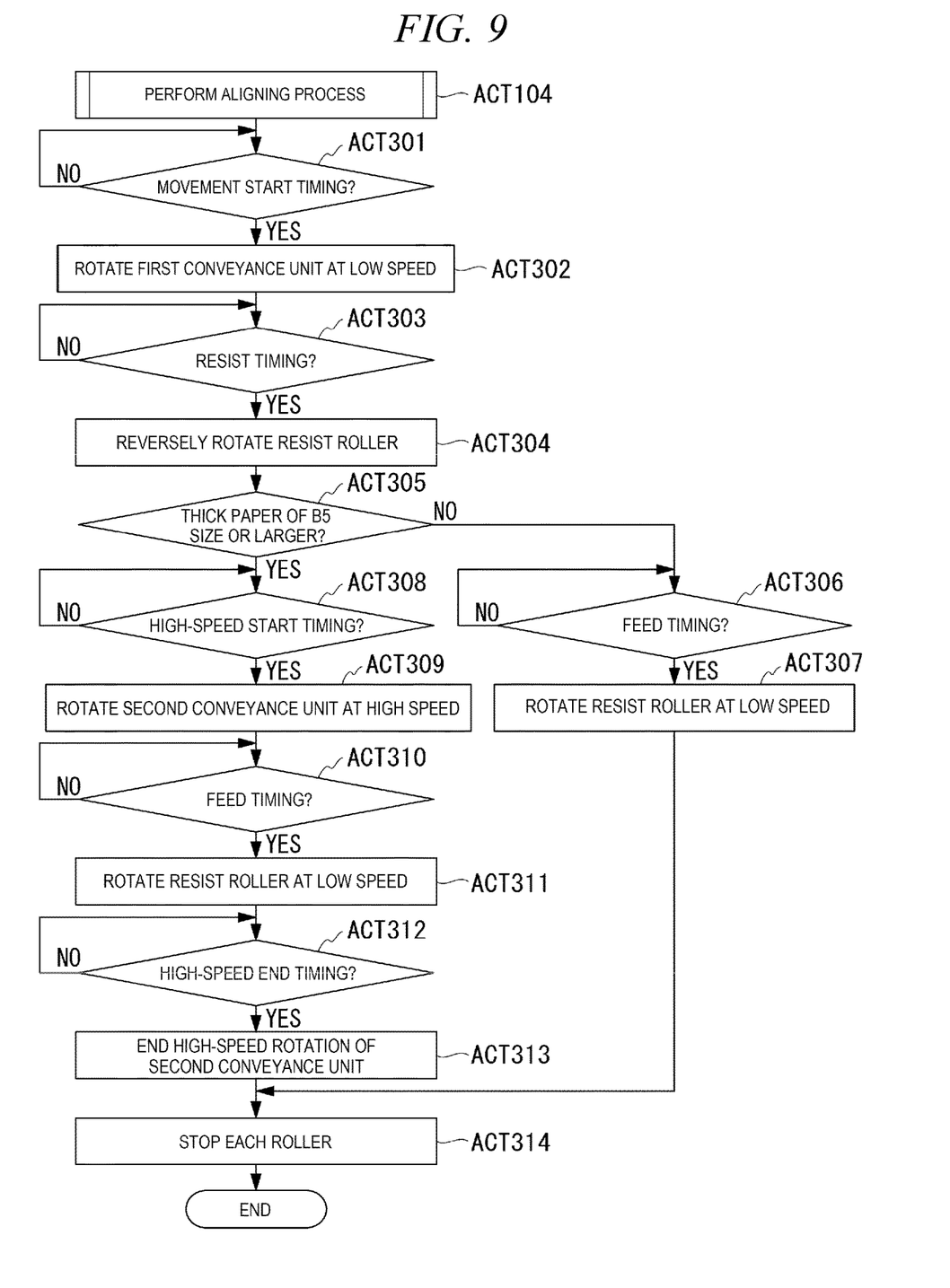
FIG. 9 is a flowchart showing an example of an aligning process.

FIG. 9 is a flowchart showing an example of the aligning process performed by the image forming device 100. In FIG. 9, the image forming device 100 waits until the movement start timing is reached (ACT 301: NO). When the movement start timing is reached (ACT 301: YES), the image forming device 100 rotates the first conveyance unit 511 at the low speed (ACT 302).

Then, the image forming device 100 waits until the resist timing is reached (ACT 303: NO). When the resist timing is reached (ACT 303: YES), the image forming device 100 reversely rotates the resist rollers 621, 622 (feed unit 510) (ACT 304). Next, based on the setting information acquired in ACT 102 in FIG. 7, the image forming device 100 determines whether the sheet 41 currently conveyed is the thick paper (e.g., specific sheet 41) of the B5 size or larger (ACT 305).

When the sheet 41 is not the thick paper of the B5 size or larger (ACT 305: NO), the image forming device 100 waits until the feed timing of the sheet 41 is reached (ACT 306: NO). When the feed timing of the sheet 41 is reached (ACT 306: YES), the image forming device 100 rotates the resist rollers 621, 622 at the low speed (e.g., process speed) (ACT 307), and the process proceeds to ACT 314.

In ACT 305, when the sheet is the thick paper of the B5 size or larger (ACT 305: YES), the image forming device 100 waits until the high-speed start timing is reached (ACT 308: NO). When the high-speed start timing is reached (ACT 308: YES), the image forming device 100 rotates the second conveyance unit 512 at the high speed (ACT 309).

Then, the image forming device 100 waits until the feed timing of the sheet 41 is reached (ACT 310: NO). When the feed timing of the sheet 41 is reached (ACT 310: YES), the image forming device 100 rotates the resist rollers 621, 622 at the low speed (e.g., process speed) (ACT 311).

Then, the image forming device 100 waits until the high-speed end timing is reached (ACT 312: NO). When the high-speed end timing is reached (ACT 312: YES), the image forming device 100 ends the high-speed rotation of the second conveyance unit 512 and causes the second conveyance unit 512 to follow the movement of the sheet 41 (ACT 313). Then, the image forming device 100 stops each roller in operation (e.g., the resist rollers 621, 622 and the first conveyance rollers 611, 612) (ACT 314), and ends a series of processes.

As described above, in the aligning process, the image forming device 100 according to the present embodiment performs the high-speed control for making the conveyance speed of the second conveyance unit 512 higher than the conveyance speed of the first conveyance unit 511. Therefore, the sheet 41 can be bent between the first conveyance unit 511 and the second conveyance unit 512. Therefore, when the sheet 41 collides with the resist rollers 621, 622, the sheet 41 can absorb the impact. Therefore, it is possible to suppress the slipping of the sheet 41 on the first conveyance rollers 611, 612 (e.g., the first conveyance unit 511) and the generation of the abnormal noise caused by the slipping.

In addition, in the present embodiment, the specific sheet 41 has the sheet size in which the rear end reaches the second position (e.g., an arrangement position of the second conveyance unit 512) when the front end reaches the resist rollers 621, 622. Therefore, it is possible to efficiently bend the sheet 41 having a size equal to or greater than the predetermined size, in which the slipping of the sheet 41 on the first conveyance rollers 611, 612 is remarkable, between the first conveyance unit 511 and the second conveyance unit 512.

In addition, in the present embodiment, the conveyance control unit 520 performs the high-speed control when the sheet size acquired from the setting information of the sheet set by the user is the sheet size of the specific sheet 41. Therefore, it is possible to easily acquire the information indicating the sheet size, and it is possible to efficiently generate the deflection 310 in the sheet 41 having the size equal to or greater than the predetermined size between the first conveyance unit 511 and the second conveyance unit 512 based on the information indicating the acquired sheet size.

In addition, in the present embodiment, the specific sheet 41 is a sheet 41 that is heavier than a normal (e.g., standard) sheet 41. Therefore, it is possible to efficiently bend the sheet 41 having a basis weight equal to or greater than the predetermined basis weight, in which the slipping of the sheet 41 on the first conveyance rollers 611, 612 is remarkable, between the first conveyance unit 511 and the second conveyance unit 512.

In addition, in the present embodiment, the conveyance control unit 520 performs the high-speed control when the weight of the sheet 41 acquired from the setting information of the sheet 41 set by the user is the weight of the specific sheet 41. Therefore, it is possible to easily acquire information indicating the weight of the sheet 41, and it is possible to efficiently generate the deflection 310 in the sheet 41 having the basis weight equal to or greater than the predetermined basis weight between the first conveyance unit 511 and the second conveyance unit 512 based on the acquired information indicating the weight of the sheet 41.

In addition, in the present embodiment, before the high-speed control, the conveyance control unit 520 performs the pre-resist process for increasing both the conveyance speed of the first conveyance unit 511 and the conveyance speed of the second conveyance unit 512. Therefore, even when the aligning process according to the present embodiment is performed, the sheet 41 of the sheet storage unit 40 can be quickly conveyed to the resist rollers 621, 622.

In addition, in the present embodiment, the conveyance control unit 520 performs the high-speed control after the pre-resist process and before the specific sheet 41 reaches the resist rollers 621, 622. Therefore, before the sheet 41 collides with the resist rollers 621, 622, the sheet 41 can be efficiently bent between the first conveyance unit 511 and the second conveyance unit 512.

In addition, in the present embodiment, the conveyance control unit 520 increases the conveyance speed of the second conveyance unit 512 after the second conveyance unit 512 is caused to follow the movement of the sheet 41 conveyed by the first conveyance unit 511 in the high-speed control. Therefore, since the sheet 41 can be stretched by the first conveyance unit 511, the deflection 310 can be generated in the sheet 41 without affecting the alignment of the sheet 41.

In addition, in the present embodiment, the conveyance control unit 520 performs the normal control when the sheet 41 other than the specific sheet 41 is fed by the resist rollers 621, 622. Therefore, in the case of the sheet 41 that is less likely to slip on the first conveyance rollers 611, 612, the sheet 41 can be efficiently conveyed because the normal control is performed.

In addition, in the present embodiment, the conveyance control unit 520 ends the high-speed control when the resist rollers 621, 622 feed the sheet 41. Therefore, it is possible to suppress a period during which the high-speed rotation of the second conveyance unit 512 is performed, so that it is possible to suppress unnecessary power consumption, and suppress promotion of deterioration due to severe exercise of the drive motor.

In each of the above embodiments, the aligning of the sheet 41 fed from the sheet storage unit 40 has been described as an example. A method in each of the above embodiments may be used for the aligning in an auto document feeder (ADF).

A computer may realize a part of functions of the image forming device 100 in the above embodiments. In this case, the program for realizing the functions is recorded on a computer-readable recording medium. Then, a program recorded on the recording medium on which the above-mentioned program is recorded may be read into a computer system and executed.

The term "computer system" used herein includes an operating system and a hardware such as a peripheral device. In addition, the "computer-readable recording medium" refers to a portable medium, a storage device, and the like. The portable medium is a flexible disk, a magneto-optical disk, a ROM, a CD-ROM, and the like. In addition, the storage device is a hard disk or the like built in the computer system. Further, the "computer-readable recording medium" is a medium that dynamically stores a program for a short period of time, like a communication line when a program is transmitted via a communication line. The communication line is a network such as Internet, a telephone line, and the like. In addition, the "computer-readable recording medium" may be a volatile memory inside the computer system that serves as a server or a client. The volatile memory stores a program for a certain period of time. In addition, the program may be used to realize a part of the functions. In addition, the program may further realize the functions in combination with the program already recorded in the computer system.

While certain embodiments have been described, these embodiments have been presented by way of example only, and are not intended to limit the scope of the inventions. Indeed, the novel embodiments described herein may be embodied in a variety of other forms. Furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An image forming device, comprising:
   a feeder, including a registration roller, configured to align a sheet and feed the sheet to a transfer system that transfers an image to the sheet;
   a first conveyor arranged at a first position on an upstream side of the feeder in a sheet conveyance direction and configured to convey the sheet to the feeder;
   a second conveyor arranged at a second position on an upstream side of the first conveyor in the sheet conveyance direction and configured to convey the sheet to the first conveyor; and
   a conveyance controller configured to perform a high-speed control for causing a conveyance speed of the second conveyor to exceed a conveyance speed of the first conveyor when the registration roller rotates in a direction opposite to the direction that supplies the sheet to the transfer system before a specific sheet which is a second type of sheet different from a first type of sheet is fed to the transfer system by the feeder.

2. The image forming device of claim 1, wherein the specific sheet has a sheet size in which a rear end of the specific sheet reaches the second position when a front end of the specific sheet reaches the feeder.

3. The image forming device of claim 2, wherein the conveyance controller performs the high-speed control when a sheet size acquired from a setting information of the sheet set by a user is the sheet size of the specific sheet.

4. The image forming device of claim 1, wherein the specific sheet is heavier than the first type of sheet, the first type of sheet being a standard sheet.

5. The image forming device of claim 4, wherein the conveyance controller performs the high-speed control when a weight of the sheet obtained from a setting information of the sheet set by a user is a weight of the specific sheet.

6. The image forming device of claim 1, wherein before the high-speed control, the conveyance controller performs a pre-resist process for increasing both the conveyance speed of the first conveyor and the conveyance speed of the second conveyor.

7. The image forming device of claim 6, wherein the conveyance controller performs the high-speed control after the pre-resist process and before the specific sheet reaches the feeder.

8. The image forming device of claim 1, wherein the conveyance controller increases the conveyance speed of the second conveyor after the second conveyor is caused to follow a movement of the sheet conveyed by the first conveyor in the high-speed control.

9. The image forming device of claim 1, wherein the conveyance controller performs a normal control different from the high-speed control when the sheet other than the specific sheet is fed by the feeder.

10. The image forming device of claim 1, wherein the conveyance controller ends the high-speed control when the feeder feeds the sheet.

11. A sheet conveyance method, comprising:
providing a feeder, including a registration roller, a first conveyor arranged at a first position on an upstream side of the feeder in a sheet conveyance direction, a second conveyor arranged at a second position on an upstream side of the first conveyor in the sheet conveyance direction, and a conveyance controller;
aligning a sheet via the feeder and providing the sheet to a transfer system that transfers an image to the sheet;
conveying via the first conveyor the sheet to the feeder;
conveying via the second conveyor the sheet to the first conveyor; and
performing via the conveyance controller a high-speed control for causing a conveyance speed of the second conveyor to exceed a conveyance speed of the first conveyor when the registration roller rotates in a direction opposite to the direction that supplies the sheet to the transfer system before a specific sheet which is a second type of sheet different from a first type of sheet is fed to the transfer system by the feeder.

12. The sheet conveyance method of claim 11, wherein the specific sheet has a sheet size in which a rear end of the specific sheet reaches the second position when a front end of the specific sheet reaches the feeder.

13. The sheet conveyance method of claim 12, wherein performing the high-speed control occurs when a sheet size acquired from a setting information of the sheet set by a user is the sheet size of the specific sheet.

14. The sheet conveyance method of claim 11, wherein the specific sheet is heavier than the first type of sheet, the first type of sheet being a standard sheet.

15. The sheet conveyance method of claim 14, wherein performing the high-speed control occurs when a weight of the sheet obtained from a setting information of the sheet set by a user is a weight of the specific sheet.

16. The sheet conveyance method of claim 11, further comprising performing a pre-resist process for increasing both the conveyance speed of the first conveyor and the conveyance speed of the second conveyor, the pre-resist process occurring before performing the high-speed control.

17. The sheet conveyance method of claim 16, wherein performing the high-speed control occurs after performing the pre-resist process and before the specific sheet reaches the feeder.

18. The sheet conveyance method of claim 11, further comprising increasing via the conveyance controller the conveyance speed of the second conveyor after the second conveyor is caused to follow a movement of the sheet conveyed by the first conveyor in the high-speed control.

19. The sheet conveyance method of claim 11, further comprising performing a normal control different from the high-speed control when the sheet other than the specific sheet is fed by the feeder.

20. The sheet conveyance method of claim 11, further comprising ending via the conveyance controller the high-speed control when the feeder feeds the sheet.

* * * * *